United States Patent [19]

Penth

[11] Patent Number: 5,885,657
[45] Date of Patent: Mar. 23, 1999

[54] PRODUCTION OF CERAMIC LAYERS AND THEIR USE

[75] Inventor: Bernd Penth, Lebach, Germany

[73] Assignee: Creavis Gesellschaft für Technologie und Innovation mbH, Marl, Germany

[21] Appl. No.: 737,890

[22] PCT Filed: Jun. 20, 1995

[86] PCT No.: PCT/DE95/00819

§ 371 Date: Dec. 3, 1996

§ 102(e) Date: Dec. 3, 1996

[87] PCT Pub. No.: WO96/00198

PCT Pub. Date: Jan. 4, 1996

[30] Foreign Application Priority Data

Jun. 23, 1994 [DE] Germany ............... 44 21 978.4
Oct. 24, 1994 [DE] Germany ............... 44 37 767.3
Nov. 9, 1994 [DE] Germany ............... 44 39 722.4

[51] Int. Cl.$^6$ ............... B05D 3/02
[52] U.S. Cl. ............... 427/372.2; 427/377
[58] Field of Search ............... 427/372.2, 377

[56] References Cited

U.S. PATENT DOCUMENTS

| | | | |
|---|---|---|---|
| 4,271,210 | 6/1981 | Yoldas | 427/169 |
| 4,286,024 | 8/1981 | Yoldas | 428/446 |
| 4,614,673 | 9/1986 | Bendig | 427/376.2 |

FOREIGN PATENT DOCUMENTS

| | | |
|---|---|---|
| 0 358 338 | 3/1990 | European Pat. Off. . |
| 0581216 | 2/1994 | European Pat. Off. . |
| 55-024923 | 2/1980 | Japan . |
| 02236151 | 9/1990 | Japan . |
| 03221146 | 9/1991 | Japan . |
| WOA 9320569 | 10/1993 | WIPO . |

OTHER PUBLICATIONS

Proceedings of the international society for optical engineering, vol. 1758, 20–22 Jul. 1992 San Diego, USA, pp. 67–76 H. Hirashima, T. Kusaka.

Thin solid films, vol. 219, No. 1/2, 30 Oct. 1992 Lausanne CH pp. 18–23, XP 000334896 L. Hu et al. "Effects of solvent om properties of sol–gel derived Ti02 coating films" see 2.1 and 2.2.

Yogyo–Kyokai–Shi, vol. 95, No. 2, 1987 Japan, pp. 150–155, T. Yoko et al. "Photoelectric properties of TiO2 films prepared by the sol–gel method".

Journal of materials science, vol. 29, No. 21, 1994 London GB, pp. 5773–5778, R. Mizutani et al. "Coating of polymethylmethacrylate with transparent SiO2 thin films by a sol–gel method".

*Primary Examiner*—Erma Cameron
*Attorney, Agent, or Firm*—Henry M. Feiereisen

[57] ABSTRACT

A process is disclosed for producing ceramic layers. A dispersion of a strongly acid hydrolysed metal composed and of a metal oxide powder is hardened at low temperatures into a mechanically stable ceramic layer. 29 g of titanium tetraisopropylate are hydrolysed in 14 g water, peptised in 42 g hydrochloric acid (25%) and mixed with 15 g nanocrystalline titanium dioxide. A 10 $\mu$m thick ceramic layer produced with this paste is hardened within 5 minutes in a hot air flow at 100° C. This ceramic layer adheres to glass, ceramic materials, metals, and is solvent and water-resistant.

22 Claims, No Drawings

PRODUCTION OF CERAMIC LAYERS AND THEIR USE

BACKGROUND OF THE INVENTION

The process of the invention describes the production of thin ceramic layers consisting of pure titanium dioxide or of titanium dioxide combined with other metal oxides at a temperature of 100° C. within 5 minutes on ceramic and metal.

The production of thin ceramic layers from titanium dioxide is known. The best known processes, like the process of the invention, start with a hydrolyzable titanium compound, then hydrolyze this compound and dissolve the precipitate generated by the hydrolysis first with an acid, thereby creating a sol. Up to this point, the inventive process is identical with the known art.

In the processes known in the art, the sol is now transformed into a gel. This is, for instance, achieved by concentrating the sol. When the gel is concentrated further, it crystallizes and forms cracks. For this reason, a surfactant is added to the gel for obtaining a crack-free layer. At a temperature of approximately 400° C. which, of course, has to be maintained over an extended period of time, the titanium dioxide particles fuse together and the surfactant evaporates or decomposes. A nanocrystalline titanium dioxide layer remains.

This process is energy intensive and time consuming and can be rather disadvantageous for practical applications, especially since the resulting strength of the titanium dioxide layers is not very high.

SUMMARY OF THE INVENTION

It is an object of the present invention to produce ceramic titanium dioxide layers which provide titanium dioxide layer with
- an increased strength
- already at a very low temperature
- after only a brief thermal treatment.

DETAILED DESCRIPTION OF PREFERRED EMBODIMENTS

For a practical application, the inventive process is initially intended to be used for improving the production of solar cells, as described in PCT WO 91/16719, PCT WO 93/20569 and others. The processes described in the referenced literature have in common that collector electrodes from titanium dioxide can only be produced by employing surfactants. The disadvantageous production conditions described above are essential for achieving an acceptable strength of the titanium dioxide layer to be produced.

The stated object of the invention as described above is achieved by introducing a novel step after the formation of the sol following the hydrolysis of the titanium compound. The sol together with the nanocrystalline titanium dioxide is blended into a dispersion. This dispersion is applied in the form of a thin layer onto the substrate to be treated. The hydrochloric acid and the water contained therein evaporates upon heating to 100° C. The titanium dioxide which was formed as a result of the hydrolysis and which is present in the sol in colloidal form, is consequently no longer in the stable equilibrium of the solution. At the same time, van der Waals binding forces are building up at the grain boundaries of the additional nanocrystalline titanium dioxide particles, thereby providing an exceptionally strong titanium dioxide layer after only a few minutes.

The stated object was also achieved by employing considerably shorter heating times and considerably lower temperatures for obtaining an improved strength of the titanium dioxide layers on the respective substrate.

Another area of use where the known method for forming titanium dioxide layers is employed, is the photocatalytic oxidation of waste water. Here, too, the inventive process overcomes the disadvantage of weak adhesion of the titanium dioxide layer to a glass substrate.

Additional experiments have shown that adding aluminum oxide in crystalline form such as ALCOA 3000 CT of a particular size exceeding 300 nm as well as in nanocrystalline form results in an equally good adhesion under the same conditions.

It has furthermore become apparent that rather advantageous results were obtained by adding other metal oxides. However, chemical reactions and the dissolution in a strongly acidic environment lead to mixed oxides, oxychlorides and the like. This outcome, however, does not prevent their utilization for special applications. With several metal oxides, a homogeneous dispersion is difficult to maintain due to their high specific gravity.

After having demonstrated the superior adhesion to glass and ceramic, the adhesion to metals was also investigated. Here, too, excellent strength was observed. The layer thickness, however, is in many cases limited to less than 10 $\mu$m due to the different thermal expansion coefficients. Titanium dioxide layers when applied to aluminum foil, adhere very well even if the foil is subjected to severe mechanical stress. The adhesion improves when the thickness of the applied titanium dioxide layer is reduced.

It is also feasible to add metal powder. It is, however, difficult to maintain a homogenous dispersion of the metals because of their often high specific gravity.

Due to the low hardening temperature, ceramic layers prepared according to the inventive process can also be applied to plastic substrates. The adhesion, however, is much weaker than for metals, glass or metal.

For all substrates, the best adhesion is generally observed when they have rough surfaces or porous bodies.

The resulting layers themselves are found to be microporous and can be employed, depending on the composition of the oxide layer, for separation in membrane technology.

It is the significant advantage of the invention that with the process described above, pure nanoscale titanium dioxide layers or layers comprising titanium dioxide and other nanoscale materials with good mechanical strength can be produced at temperatures as low as approximately 100° C.

Processes previously known in the art required temperatures in excess of 400° C. for obtaining a metal oxide layer with the same strength.

The ceramic or metal-ceramic layers which can be produced by this method at low temperatures, can be used, aside from many conventional applications, also for numerous novel applications utilizing ceramic materials. Possible uses are for active catalytic layers, as sensors, for the immobilization of enzymes and catalysts, for the manufacture of photovoltaic cells, for the fabrication of photocatalytic layers as well as for the use as active filter layers for applications in filter membranes. As a result of the excellent adhesion to metals, possible applications include heat-resistant insulators for electrical wiring, but also capacitors with preferred properties.

The advantage of the inventive process over known production processes for ceramic layers is that the object of producing ceramic layers is already achieved under moderate thermal conditions. Aside from reduced manufacturing cost for purely ceramic layers, new possibilities ensue since materials affected by elevated temperatures, such as organic compounds, having desired catalytic, optical or electrical properties can now also be included in the class of ceramic materials.

EXAMPLE 1

10 to 40 part by weight, preferably 29 parts by weight, of titanium tetraisopropylate is hydrolyzed with 5 to 20 parts by weight, preferably 14 parts by weight, of water to provide a hydrolyzed compound which is peptized by adding and blending 42 parts by weight of a 25% hydrochloric acid to form a solution. 10 to 25 parts by weight, preferably 15 parts by weight, of a nanocrystalline titanium dioxide and/or crystalline titanium dioxide are subsequently added to the solution to form a dispersion. The dispersion is then applied by a doctor, or spraying or printing as thin layer onto a substrate of glass, metal, ceramic or plastics and solidified at a temperature of approximately 100° C. in a flow of hot air within approximately 5 minutes.

EXAMPLE 2

The dispersion formed in a manner as described in Example 1 is applied by a doctor, or spraying or printing in the form of a thin layer onto a substrate of porous glass mat or sintered glass, porous ceramics or ceramic fleece, metal fleece or porous sintered metal or plastic fleece or porous sintered plastic of a pore size of between 0.5 and 30 $\mu$m. Subsequently, the dispersion is allowed to solidify at a temperature of approximately 100° C. in a hot flow of hot air within approximately 5 minutes.

EXAMPLE 3

For making water resistant and temperature resistant surface gluing of glass, ceramic and metallic components, a dispersion is made by hydrolyzing 24 parts by weight of titanium tetraisopropylate with 12 parts by weight of water to provide a hydrolyzed compound which is peptized by adding and blending 35 parts by weight of a 25% hydrochloric acid to form a solution. 5 parts by weight of nanocrystalline titanium dioxide together with 20 to 55 parts by weight of aluminum oxide (ALCOA 3000 CT) and/or 0 to 5 parts by weight of nanocrystalline aluminum oxide. The dispersion is applied as thin layer on surfaces to be glued together, with at least one of the surfaces being made of a porous material. Subsequently, the dispersion is hardened at a temperature of 100° C. within approximately 20 minutes.

EXAMPLE 4

For use in electrical applications and in semiconductor technology, in particular in photovoltaics for producing a collector electrode of titanium dioxide, a dispersion is made by hydrolyzing 29 parts by weight of titanium tetraisopropylate with 14 parts by weight of water to provide a hydrolyzed compound which is peptized by adding and blending 42 parts by weight of a 25% hydrochloric acid to form a solution. 15 to 25 parts by weight of nanocrystalline titanium dioxide or photosensitized titanium oxide and/or 0 to 5 parts by weight of nanocrystalline aluminum oxide and 0 to 2 parts by weight of titanium(III)-chloride are subsequently blended into the solution. The thus-formed dispersion is applied as thin layer on a substrate by a doctor at a thickness of 5 to 40 $\mu$m, and allowed to dry at a temperature of 100° C. for approximately 5 minutes.

EXAMPLE 5

For use in electrical applications and in semiconductor technology, in particular as insulators and as capacitors, the dispersion formed in a manner as described in Example 1 is applied at a thickness of 5 to 10 $\mu$m on a surface of conductive material, and allowed to dry in a flow of warm air at a temperature of 100° C. for approximately 5 minutes, to thereby electrically insulate the conductive metal layers from each other during coiling.

EXAMPLE 6

For use in biotechnology for immobilizing enzymes in the ceramic layer, 1 to 2 parts by weight of enzymes is stirred into the dispersion on ceramic base and formed in a manner as described in Example 1. The thus-formed solution is applied in the form of a layer at a thickness of 5 to 10 $\mu$m by a doctor onto a substrate, and subsequently allowed to dry in a flow of warm air at a temperature of approximately 80° C. for 1 hour.

EXAMPLE 7

For use as catalysts, in particular for photocatalytic oxidation under UV radiation, the dispersion formed in a manner as described in Example 1 is applied onto a glass plate, and allowed to dry in a flow of warm air at a temperature of 100° C. for approximately 5 minutes.

EXAMPLE 8

For use as catalysts, for example as titanium dioxide layers for photocatalytic oxidation under UV radiation, a dispersion is made from 29 parts titanium tetraisopropylate, 14 parts water, 42 parts hydrochloric acid (25%) and 15 parts nanocrystalline titanium dioxide and subsequently the dispersion is doctored onto a glass plate at a thickness of 5 to 10 $\mu$m or, for example, glass fibers are coated by immersion into the dispersion. Subsequently, the dispersion is dried in a flow of warm air at a temperature of 100° C. for approximately 5 minutes.

EXAMPLE 9

For use as sensors, such as gas sensors, such as gas sensors, especially titanium dioxide layers as oxygen sensors, a dispersion is made on the basis of 29 parts by weight of titanium tetraisopropylate, 14 parts by weight of water, 42 parts by weight of hydrochloric acid (25%), 0 to 3 parts by weight of titanium(III) chloride and 15 parts by weight of nanocrystalline titanium dioxide. The thus-formed dispersion is doctored or printed at a thickness of 5 to 10 $\mu$m onto a suitable substrate, and allowed to dry in a flow of warm air at a temperature of 100° C. for approximately 5 minutes.

EXAMPLE 10

For use in filter technology, a dispersion is made on the basis of 12 parts by weight of titanium tetraisopropylate, 6 parts by weight of water, 17 parts by weight of hydrochloric acid (25%) and 0 to 5 parts by weight of nanocrystalline titanium dioxide and 0 to 80 parts by weight of aluminum oxide. The dispersion is applied onto a porous substrate made of ceramics, glass, plastics or metal, and allowed to dry in a flow of warm air at a temperature of 100° C. for approximately 5 minutes to form a microporous or ultraporous layer for use as active filter layer for material separation as membrane filter for reverse osmosis, ultrafiltration, microfiltration and gas separation.

In general, persons skilled in the art will understand that instead of or in addition to titanium dioxide, another crystalline or nanocrystalline metal oxide or several other crystalline or nanocrystalline metal oxides, such as aluminum oxide, lead oxide, chromium oxide, iron oxide, indium oxide, copper oxide, magnesium oxide, ruthenium oxide, silicon oxide, titanium suboxide, vanadium oxide, tungsten oxide, zinc oxide, tin oxide, zirconium oxide or mixed oxides, such as silicates, titanates or selenides, tellurides, sulfides, carbides, nitrides in crystalline or nanocrystalline form can be employed for producing the dispersion.

In addition, persons skilled in the art will understand that instead of or in addition to metal oxide, metal powder made of aluminum, lead, bronze, chromium, iron, gold, hastelloy, inconel, copper, magnesium, molybdenum, monel, nickel, palladium, platinum, rhodium, rhenium, silver, stainless steel, tantalum, titanium, vanadium, tungsten, zinc, tin or zirconium in powder form, preferably in the form of nanoscale-size particles, may be employed for producing the dispersion.

I claim:

1. A process of producing a ceramic layer for use in filter membranes, comprising the steps of:

hydrolyzing 10–40 parts by weight of a hydrolyzable titanium compound with 5–20 parts by weight of water to provide a hydrolyzed compound;

peptizing the hydrolyzed compound by addition of and blending with an acid to form a solution;

adding and blending to the solution 10–25 parts by weight of aluminum oxide having a particle size exceeding 300 nm to form a dispersion;

applying a layer of the dispersion onto a substrate selected from the group consisting of glass, metal, ceramic and plastics; and allowing the dispersion to solidify on the substrate at a temperature of approximately 100° C. within approximately 5 minutes.

2. The process of claim 1 wherein the titanium compound includes 29 parts by weight of titanium tetraisopropylate.

3. The process of claim 1 wherein the titanium compound is hydrolyzed with 14 parts by weight of water.

4. The process of claim 1 wherein the acid includes 42 parts by weight of 25% by weight of hydrochloric acid.

5. The process of claim 1 wherein said adding and blending step includes adding 15 parts by weight of aluminum oxide to the solution.

6. The process of claim 1 wherein the dispersion is applied onto the substrate at a thickness of 0.1–10 $\mu$m.

7. The process of claim 1 wherein said applying step is effected by a process selected from the group consisting of doctoring, spraying or printing.

8. The process of claim 1 wherein said solidifying step is effected in a flow of hot air.

9. The process of claim 1 wherein the glass substrate is selected from the group consisting of porous glass mat and sintered glass.

10. The process of claim 1 wherein the ceramic substrate is selected from the group consisting of porous ceramics and ceramic fleece.

11. The process of claim 1 wherein the metallic substrate is selected from the group consisting of metallic fleece and sintered metal.

12. The process of claim 1 wherein the plastic substrate is selected from the group consisting of plastic fleece and porous sintered plastics.

13. The process of claim 1 wherein the substrate has a pore width of 0.5 to 30 $\mu$m.

14. The process of claim 1 for use in filter technology, comprising the steps of applying the dispersion onto a porous substrate made of a material selected from the group consisting of ceramics, glass, plastics and metal, and allowing the dispersion to dry in a flow of warm air at a temperature of 100° C. for approximately 5 minutes to form a microporous or ultraporous layer for use as active filter layer for material separation as membrane filter for reverse osmosis, ultrafiltration, microfiltration and gas separation.

15. The process of claim 1, and further comprising the step of adding titanium dioxide to the dispersion before the applying step.

16. The process of claim 1, and further comprising the step of adding titanium dioxide, vanadium oxide and tungsten oxide to the dispersion before the applying step.

17. The process of claim 1, and further comprising the step of adding titanium dioxide and iron oxide to the dispersion before the applying step.

18. The process of claim 1, and further comprising the step of adding a compound selected from the group consisting of titanate and silicate to the dispersion before the applying step.

19. The process of claim 1, and further comprising the step of adding silicon dioxide to the dispersion before the applying step.

20. The process of claim 1, and further comprising the step of adding a compound selected from the group consisting of copper oxide and zirconium oxide to the dispersion before the applying step.

21. The process of claim 1, and further comprising the step of adding a compound selected from the group consisting of iron oxide and chromium oxide to the dispersion before the applying step.

22. The process of claim 1, and further comprising the step of adding a metal powder selected from the group consisting of nickel, chromium, copper, palladium and platinum.

* * * * *